United States Patent Office 3,522,910
Patented Aug. 4, 1970

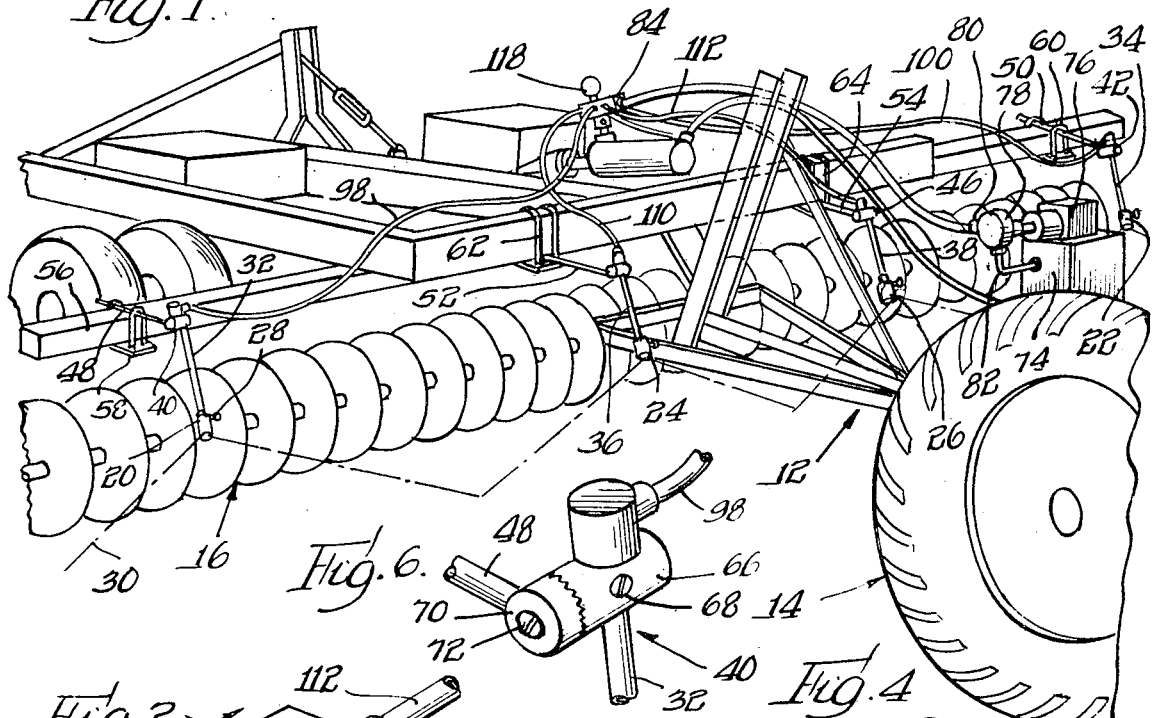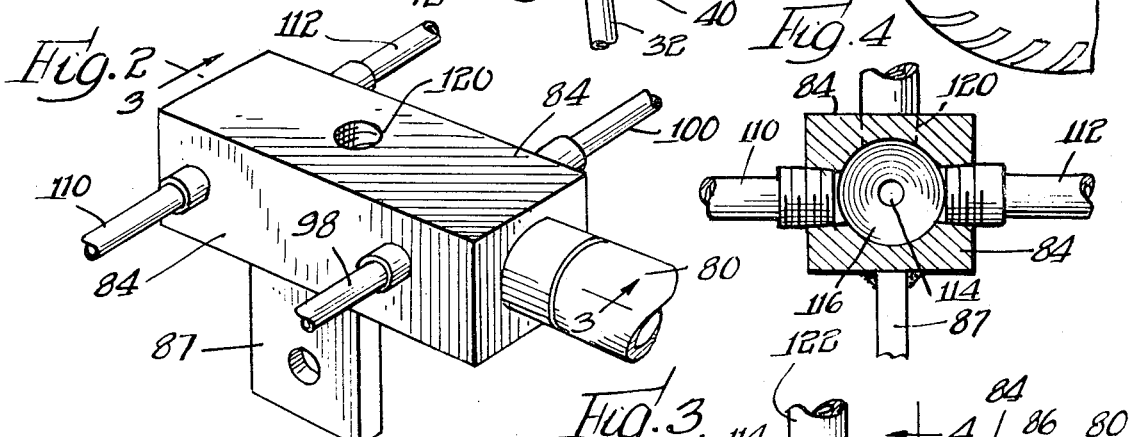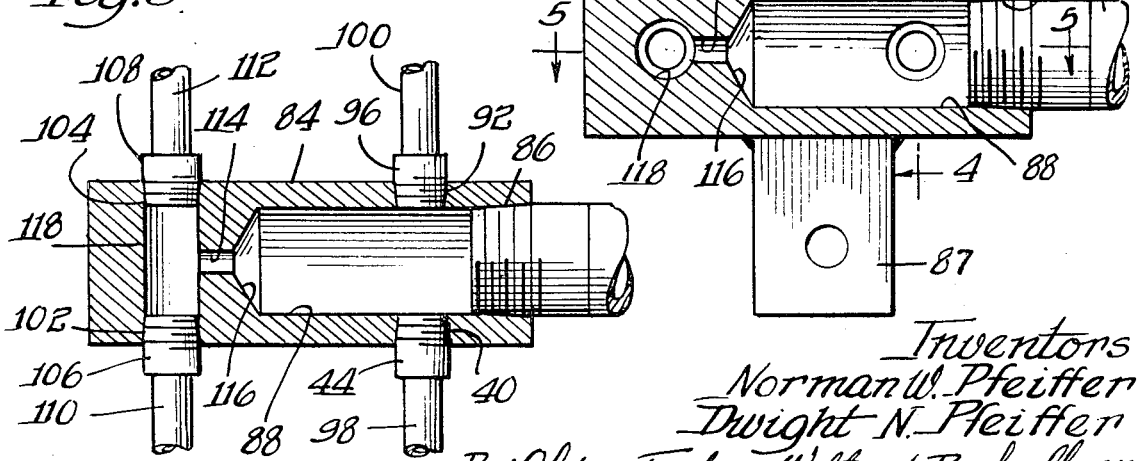

---

3,522,910
SPRAY SYSTEM
Norman W. Pfeiffer and Dwight N. Pfeiffer, Mount Vernon, Ind., assignors to Chem-Farm Inc., Evansville, Ind., a corporation of Indiana
Filed Jan. 22, 1968, Ser. No. 699,564
Int. Cl. B05b 1/20
U.S. Cl. 239—163          8 Claims

ABSTRACT OF THE DISCLOSURE

There is disclosed a system for spraying agricultural chemicals such as liquid fertilizers, herbicides and the like. The system comprises a plurality of individual spray heads precalibrated to permit a predetermined flow rate when the liquid is delivered thereto at a predetermined pressure. The spray heads are mounted in spaced relationship across a cultivator or the like and are fed from a common source including a plurality of lines of different lengths connected with a common manifold having a metering orifice therein communicating with certain of the lines, the manifold, metering orifice and various lines being correlated so that the fluid pressure is substantially the same at all of the spray heads.

---

The present invention relates to a novel spray system, and more specifically to a novel system especially suitable for spraying agricultural chemicals such as liquid fertilizers, herbicides, insecticides and the like.

Many different spraying apparatus or machines have heretofore been proposed for use in agriculture. While many of these have proved to be successful, they have usually been relatively complicated and expensive and/or have required the farmer to purchase a separate vehicle incorporating the spraying apparatus, which vehicle may be self-propelled or adapted to be pulled. Furthermore, heretofore proposed apparatus including a plurality of spray heads have been constructed so that the user is required to adjust each spray head in the field in an attempt to obtain uniform sprays from the heads.

It is an important object of the present invention to provide a novel farm chemical spray system in the form of a kit or attachment of simple and economical construction and adapted to be mounted on a vehicle such as a tractor or cultivator already in the possession of a farmer.

A further object of the present invention is to provide a novel farm chemical spraying system in the form of an attachment which may be installed either on new or existing equipment without the need for any substantial modification of such equipment.

A further important object of the present invention is to provide a novel farm chemical spraying system incorporating a plurality of individual spray heads and constructed for delivering substantially uniform sprays from the heads without requiring the user to adjust the spray heads individually.

A more specific object of the present invention is to provide a novel farm chemical spray system comprising a plurality of precalibrated and adjusted individual spray heads adapted to be mounted at spaced apart locations and connectable with a source of liquid to be sprayed by means including a common manifold and a plurality of lines of different lengths, which manifold and lines are constructed and correlated with each other so that liquid is delivered to each spray head at substantially the same pressure.

Other objects and advantages of the present invention will become apparent from the following description and the accompanying drawings wherein:

FIG. 1 is a fragmentary perspective view showing a spraying system incorporating features of the present invention mounted on a farm vehicle comprising a tractor and a cultivator connected to and pulled by the tractor;

FIG. 2 is an enlarged fragmentary perspective view showing a manifold incorporated in a system of FIG. 1 for directing liquid to be sprayed to a plurality of spray heads;

FIG. 3 is a partial sectional view taken generally along line 3—3 in FIG. 2;

FIG. 4 is a sectional view taken along line 4—4 in FIG. 3;

FIG. 5 is a partial sectional view taken along line 5—5 in FIG. 3; and

FIG. 6 is a fragmentary perspective view showing an adjustable bracket for supporting a spray head incorporated in the apparatus of this invention.

Referring now more specifically to the drawings wherein like parts are designated by the same numerals throughout the various figures, a spraying system 10 incorporating features of the present invention is shown in FIG. 1 mounted on a farm vehicle 12. In this embodiment the farm vehicle comprises a tractor 14 and a cultivator 16 connected to the tractor by a pull bar 18. It is to be understood that these components of the farm vehicle may be of any known construction and that the spraying system may be installed on a variety of different farm vehicles also of known construction.

In the embodiment shown, the spraying system 10 comprises a pair of spray heads 20 and 22 disposed toward opposite outer ends of the cultivator 16 and another pair of spray heads 24 and 26 mounted inwardly of the outboard spray heads 20 and 22. All these spray heads are of identical and known construction and need not be described in detail. It suffices to state that each spray head may be provided with an idjustable needle valve or a screw element 28 so that it may be precalibrated by the manufacturer to deliver the liquid to be sprayed at a predetermined rate when such liquid is supplied to the head at a predetermined pressure. By way of example only, it is contemplated that the spray heads may be precalibrated at the factory for spraying a liquid at the rate of .50 g.p.m. when the liquid is supplied to the head at a pressure of 20 p.s.i. It is understood that the spray heads may be precalibrated so as to provide any desired spray rate. In any event, the spray heads 20–26 are precalibrated so that the deliveries thereof will be related to each other in a predetermined desired manner when the liquid to be sprayed is supplied thereto at a predetermined pressure. Preferably the spray heads are precalibrated so that their delivery rates are uniform.

As shown in FIG. 1, the spray heads are constructed to deliver sprays 30 having a diverging pattern. Furthermore the spray heads are spaced from each other so that their spray patterns overlap in a manner for covering the ground or foliage being sprayed substantially uniformly. In order to enchance the uniform coverage and to minimize any disruption of the spray patterns by wind and the like, the spray heads are positioned in relatively close proximity to the ground. More specifically, the spray heads are respectively connected to and supported by lower ends of rigid pipes or conduits 32, 34, 36 and 38. These conduits in turn have upper end portions supported by adjustable clamping devices 40, 42, 44 and 46. These devices are mounted on brackets 48, 50, 52 and 54 secured to a transverse frame member 56 or any other desired part of the vehicle by suitable clamps 58, 60, 62 and 64.

The clamping device 40 is constructed for enabling the height and angle of the spray head supporting conduit 32 to be adjusted. Referring particularly to FIG. 6, the device 40, in the embodiment shown, has a main apertured body 66 adjustably receiving the conduit 32. A set screw 68 secures the conduit in the desired adjusted position relative to the body 66. The body is carried by and is rotatably adjustable relative to a head member 70 fixed on the bracket arm 48. Another screw 72 releasably secures the body 66 to the head 70 with the conduit 32 extending downwardly at the desired angular position. It is understood that the remaining gripping devices 42, 44 and 46 are identical to the device 40 and need not be described in detail.

The system 10 includes means for providing liquid to be sprayed under pressure. In the embodiment shown, this means comprises a storage tank or reservoir 74 suitably mounted on the tractor 14 and a combined electric motor and pump unit 76 connected with the reservoir. The pump has an outlet connected with a valve 78. This valve is an adjustable pressure relief valve of known construction and has a primary outlet port connected with a conduit 80 for directing liquid to the spray heads as will be described below. The pressure relief valve also has a bypass port connected with a conduit 82 extending back to the reservoir 74. The construction is such that the pump normally delivers liquid at a rate greater than the desired spray rate and the pressure relief valve 78 opens sufficiently to return the excess liquid to the reservoir through the conduit 82. Thus, liquid at a desired predetermined pressure is positively maintained in the supply line 80.

The supply line 80 of the liquid supply system is connected with means for dividing the flow of liquid and delivering the liquid to the spray heads so that the pressure at each spray head is at a substantial predetermined value relative to the other spray heads. Preferably the pressure at all the spray heads is substantially the same. This means comprises a manifold 84 having a large diameter inlet port 86 communicating with the supply line 80. A bracket 87 is welded or otherwise secured to the manifold so that the manifold is adapted to be mounted on the vehicle at a suitable location generally mid-way between the inboard spray heads.

The inlet port 86 of the manifold communicates with a large diameter axially extending passageway 88. Outlet ports 90 and 92 are formed in opposite sides of the manifold adjacent the inlet port 86. These outlet ports are connected by fittings 94 and 96 with flexible conduits or lines 98 and 100. These lines respectively extend to and are connected to upper ends of the rigid spray head supporting pipes or conduits 32 and 34. The construction is such that the internal resistance to flow and therefore the total fluid pressure drop in the line comprising the flexible hose or conduit 98 and the rigid pipe 32 is substantially identical to the internal resistance to flow and total fluid pressure drop in the line comprising the flexible hose or conduit 100 in the rigid pipe 34. Preferably, the fittings 94 and 96 are substantially identical to each other and the conduits or hoses 98 and 100 have identical internal diameters and lengths as do the pipes 32 and 34. Thus, the fluid which enters these lines from the passageway 88 of the manifold undergoes substantially the same pressure drop so that the pressure at the spray heads 20 and 22 is substantially equal. As a result, the sprays delivered by the heads 20 and 22 will be substantially equal.

The manifold 84 has additional oppositely disposed outlet ports 102 and 104 downstream from the above mentioned outlet ports. These ports are connected by fittings 106 and 108 and flexible conduits or lines 110 and 112 with the upper ends of the inboard spray head supporting pipes 36 and 38 respectively. The fittings 106 and 108 are preferably identical to the fittings 94 and 96 and the conduits or flexible hoses 110 and 112 are preferably made from the same stock and have the same internal diameter as the previously mentioned hoses 98 and 100. The length of the hoses 110 and 112 is, however, substantially less than the length of the hoses 98 and 100. The lengths of these hoses are correlated with the position of their respective associated spray heads so that each hose is extended substantially fully without coiling or sharp bends therein which might unduly and unpredictably affect the flow characteristics of the conduits in a manner causing irregular pressure drops. At the same time, the hoses have sufficient length so that they need not be stretched or placed under tension stresses.

The portions of the liquid supply system or lines extending from the inlet of the manifold to the inboard spray heads are such that a predetermined pressure drop is obtained and preferably are such that the pressure at the inboard spray heads is substantially identical to the pressure at the outboard spray heads. More specifically, the manifold 84 is formed with a flow restriction or metering orifice 114 communicating with the downstream end of the large passageway 88 through a converging or conical inlet section 116. The outlet end of the orifice 114 communicates with a mid portion of a passageway 118 extending transversely of the manifold between and being of substantially the same diameter as the outlet ports 102 and 104. The diameter and configuration of the metering orifice 114 is correlated with the remaining portions of the fluid lines and particularly the short flexible conduits or hoses 110 and 112 so that the aforementioned desired pressure drop is obtained at the inboard spray heads.

With the structure described above, it is seen that an operator may easily obtain desired spray rates without the necessity of time-consuming and difficult individual adjustment of the spray heads. Furthermore, the operator can control and adjust the rate of spray simply by adjusting the pressure release valve 78 so as to adjust the pressure of the liquid delivered to the manifold 84. If desired, a suitable pressure gauge 118 may be connected with a port 120 in the manifold by means of a pipe 122 to enable an operator to read directly the pressure of the liquid being sprayed. Preferably, a chart, now shown, is supplied by the manufacturer with the spraying system, which chart indicates the spraying rates which will be obtained for given pressure readings on the gauge 118.

The invention is claimed as follows:

1. An agricultural spraying apparatus for installation on a vehicle comprising a plurality of precalibrated spray heads for spraying liquid at a predetermined rate when such liquid is supplied thereto at a predetermined pressure and mountable at spaced apart locations on said vehicle, a liquid supply system including a manifold mountable on said vehicle, and a plurality of liquid lines of different relatively long and short lengths respectively connecting said manifold and said spray heads for supplying liquid from said manifold to said spray heads with substantially predetermined related pressure drops between said manifold and each of the spray heads, said manifold having first and second passageways in communication with an inlet port connectable with a source of liquid under pressure, a first outlet port communicating with said first passageway and a second outlet port downstream from said first outlet port and communicating with said second passageway, one of said relatively long lines being connected with said first outlet port, one of said relatively short lines being connected with said second outlet port, and flow restricting means affording communication between said first and second passageways.

2. An apparatus, as defined in claim 1, wherein said relatively long line has a predetermined internal diameter and length providing a first pressure drop between said manifold inlet and its associated spray head, and said flow restricting means and said relatively short line combining in providing substantially the same pressure drop between said manifold inlet and the spray head connected to said short line.

3. An apparatus, as defined in claim 2, which includes four of said spray heads arranged to provide a pair of spaced apart inboard spray heads and pair of outboard spray heads, said manifold being located generally mid-way between said inboard spray heads, said manifold including a pair of said first outlet ports adjacent said inlet port, a pair of said relatively long lines of substantially equal length respectively connected between said first ports and said outboard spray heads, said manifold including a pair of said second outlet ports, and a pair of said relatively short lines of substantially equal length respectively connected between said second outlet ports and said inboard spray heads.

4. An apparatus, as defined in claim 3, wherein said flow restricting means comprises restricted orifice means between said first passageway and said second passageway.

5. An apparatus, as defined in claim 4, wherein said manifold has said inlet port at one end thereof, said first outlet ports being smaller than said inlet port and disposed in opposite sides of said manifold adjacent said inlet port, said second outlet ports being smaller than said inlet port and disposed in opposite sides of said manifold, said second passageway comprises a transverse passageway joining said second outlet ports and intersecting said restricted orifice means.

6. An apparatus, as defined in claim 3, wherein said lines respectively include rigid pipe sections connected to and supporting the respective spray heads, and bracket means secured to said pipe sections and connectable to the vehicle.

7. An apparatus, as defined in claim 1, which includes a source of liquid to be sprayed mountable on said vehicle, and adjustable means connected between said source and said manifold inlet for delivering said liquid to the manifold at a predetermined substantially constant pressure.

8. An apparatus, as defined in claim 7, which includes fluid pressure indicating means connecting to and communicating with the interior of said manifold.

References Cited

UNITED STATES PATENTS

| | | | |
|---|---|---|---|
| 933,039 | 8/1909 | Knapp | 239—164 X |
| 1,398,845 | 11/1921 | Davis | 137—608 X |
| 3,139,848 | 7/1964 | Welty | 239—159 X |
| 2,598,961 | 6/1952 | Andrus. | |

M. HENSON WOOD, Jr., Primary Examiner

M. Y. MAR, Assistant Examiner

U.S. Cl. X.R.

137—608; 239—550; 251—123